(12) United States Patent
Clawson, Jr. et al.

(10) Patent No.: US 11,957,128 B2
(45) Date of Patent: Apr. 16, 2024

(54) WOOD TREATMENT SOLUTIONS CONTAINING FUNGICIDES AND TERTIARY ALKANOLAMINES AND RELATED METHODS, WOOD PRODUCTS AND COMPOSITION FOR PROTECTION AGAINST FUNGAL ORGANISMS

(71) Applicant: KOP-COAT, INC., Pittsburgh, PA (US)

(72) Inventors: Ronald W. Clawson, Jr., Trafford, PA (US); Kenneth A. Cutler, Pittsburgh, PA (US); Justin J. Bohn, Pittsburgh, PA (US)

(73) Assignee: KOP-COAT, INC., Pittsburgh, PA (US)

( * ) Notice: Subject to any disclaimer, the term of this patent is extended or adjusted under 35 U.S.C. 154(b) by 0 days.

(21) Appl. No.: 17/815,046

(22) Filed: Jul. 26, 2022

(65) Prior Publication Data
US 2022/0369629 A1 Nov. 24, 2022

Related U.S. Application Data

(62) Division of application No. 16/151,496, filed on Oct. 4, 2018, now Pat. No. 11,432,546.

(51) Int. Cl.
| | |
|---|---|
| *A01N 33/08* | (2006.01) |
| *A01N 25/02* | (2006.01) |
| *A01N 25/04* | (2006.01) |
| *A01N 31/02* | (2006.01) |
| *A01N 31/14* | (2006.01) |
| *A01N 33/12* | (2006.01) |
| *A01N 37/02* | (2006.01) |
| *A01N 37/10* | (2006.01) |
| *A01N 37/34* | (2006.01) |
| *A01N 43/36* | (2006.01) |
| *A01N 43/40* | (2006.01) |
| *A01N 43/42* | (2006.01) |
| *A01N 43/52* | (2006.01) |
| *A01N 43/54* | (2006.01) |
| *A01N 43/56* | (2006.01) |
| *A01N 43/653* | (2006.01) |
| *A01N 43/78* | (2006.01) |
| *A01N 43/80* | (2006.01) |
| *A01N 47/06* | (2006.01) |
| *A01N 47/12* | (2006.01) |
| *A01N 55/08* | (2006.01) |
| *A01N 59/14* | (2006.01) |
| *A01P 3/00* | (2006.01) |
| *B27K 3/52* | (2006.01) |

(52) U.S. Cl.
CPC ............ *A01N 33/08* (2013.01); *A01N 25/02* (2013.01); *A01N 25/04* (2013.01); *A01N 31/02* (2013.01); *A01N 31/14* (2013.01); *A01N 33/12* (2013.01); *A01N 37/02* (2013.01); *A01N 37/10* (2013.01); *A01N 37/34* (2013.01); *A01N 43/36* (2013.01); *A01N 43/40* (2013.01); *A01N 43/42* (2013.01); *A01N 43/52* (2013.01); *A01N 43/54* (2013.01); *A01N 43/56* (2013.01); *A01N 43/653* (2013.01); *A01N 43/78* (2013.01); *A01N 43/80* (2013.01); *A01N 47/06* (2013.01); *A01N 47/12* (2013.01); *A01N 55/08* (2013.01); *A01N 59/14* (2013.01); *A01P 3/00* (2021.08); *B27K 3/52* (2013.01); *B27K 2240/20* (2013.01)

(58) Field of Classification Search
None
See application file for complete search history.

(56) References Cited

U.S. PATENT DOCUMENTS

| | | |
|---|---|---|
| 4,950,685 A | 8/1990 | Ward |
| 5,078,912 A | 1/1992 | Goettsche et al. |
| 5,186,947 A | 2/1993 | Goettsche et al. |
| 5,665,432 A * | 9/1997 | Kuwazuru ............ A01N 57/14 427/393 |
| 5,874,025 A | 2/1999 | Heuer et al. |
| 7,056,919 B2 | 6/2006 | Ross et al. |
| 7,896,960 B2 | 3/2011 | Ward et al. |
| 8,741,324 B2 | 6/2014 | Finch et al. |
| 2002/0115783 A1* | 8/2002 | Nyssen ................. A01N 25/04 524/800 |
| 2005/0150419 A1 | 7/2005 | Zhang et al. |
| 2008/0280792 A1 | 11/2008 | Williams |
| 2009/0318571 A1 | 12/2009 | Utz et al. |
| 2012/0048295 A1 | 3/2012 | Du et al. |
| 2012/0121723 A1 | 5/2012 | Mookerjee et al. |
| 2014/0147691 A1 | 5/2014 | Humphrey et al. |
| 2016/0286795 A1 | 10/2016 | Ward et al. |

FOREIGN PATENT DOCUMENTS

| | | |
|---|---|---|
| EP | 0514644 A2 | 11/1992 |
| EP | 0542071 A1 | 5/1993 |
| EP | 1025967 A1 | 8/2000 |

(Continued)

OTHER PUBLICATIONS

English translation for JP2005-59218A (Year: 2005).*
Derwent English abstract for EP 1025967A1 (Year: 2000).
English translation for EP 1025967A1 (Description section) (Year: 2000).
English translation for EP 1025967A1 (Claim section) (Year: 2000).

(Continued)

*Primary Examiner* — Sin J Lee
(74) *Attorney, Agent, or Firm* — Debora Plebo-Dujowich; Eckert Seamans Cherin & Mellott, LLC

(57) ABSTRACT

The present invention provides a solution and related composition of matter and methods which synergistically improves a fungicide's effectiveness in resisting undesired fungal growth. The invention also provides wood and wood products which have been treated with the solution, method or compound.

7 Claims, No Drawings

(56) References Cited

FOREIGN PATENT DOCUMENTS

JP    2005059218 A  *  3/2005
WO    2016201512 A1    12/2016

OTHER PUBLICATIONS

Material Safety Data Sheet on 1,4-Butanediol, obtained from the website: http://www.whitakeroil.com/wp-content/uploads/2018/04/14-Butanediol .pdf (Year: 2012).
English translation for EP1025967A1 (Year: 2000).

* cited by examiner

WOOD TREATMENT SOLUTIONS CONTAINING FUNGICIDES AND TERTIARY ALKANOLAMINES AND RELATED METHODS, WOOD PRODUCTS AND COMPOSITION FOR PROTECTION AGAINST FUNGAL ORGANISMS

CROSS-REFERENCE TO RELATED APPLICATIONS

This application is a divisional of U.S. application Ser. No. 16/151,496, filed Oct. 4, 2018, which is incorporated by reference in its entirety.

BACKGROUND OF THE INVENTION

1. Field of the Invention

The present invention relates to synergistic wood treatment combinations of fungicides and tertiary alkanolamines as well as related methods, wood products and compositions to provide enhanced protection against fungal organisms. It also relates to such compositions and formulants containing unique combinations of inert co-formulants with biologically significant fungicides.

2. Description of the Prior Art

Wood is one of the best structural materials for the construction of buildings because of its strength, ease of processing and relatively low cost. However, wood and wood-based materials, including cellulosic composites and plastic-wood composites, are susceptible to attack from various fungal organisms. Fungal attack can result in cosmetic damage (stain, mold and mildew) and/or structural degradation (decay) to both solid wood and wood-based composites.

Mold organisms, in addition to altering the properties and marring the appearance of wood, can present a health hazard in indoor environments as certain mold spores have the potential to be human respiratory allergens.

Sapstain is a particular problem for freshly sawn green lumber. Although attack by sapstain fungi does not generally result in the reduction of strength properties, sapstain can seriously degrade the value of lumber by impairing its appearance.

Preservative chemicals have been used since antiquity to prevent the onset of mold, stain and decay to wood in service. In recent times, the use of some wood preserving chemicals has been restricted or curtailed due to concerns about their safety to humans and their effects on the environment. Cost effectiveness of preservative treatments is also a major consideration as wood ultimately competes with non-cellulosic construction materials including steel, plastic and concrete.

Mold, mildew, decay and rot have individually or in combination resulted in substantial destruction of wood and products made therefrom. Providing protection for wood against fungal attack has been an ongoing problem with many solutions having been suggested. See for example, U.S. Pat. Nos. 7,056,919 and 4,950,685.

Despite the numerous materials which have been employed in resisting undesired fungal organism attack on wood, there remains a very real and substantial need for improved fungicides which will provide enhanced protection for wood and wood products. The present invention provides synergistic formulations of fungicides which are employable with tertiary amino alcohols (tertiary alkanolamines) to provide a synergistic increase in efficacy against fungal organisms.

SUMMARY OF THE INVENTION

The present invention provides a fungal organism controlling solution and related methods, treated wood and compositions which comprise a tertiary alkanolamine, at least one fungicide and a solvent, such as water. The tertiary alkanolamine preferably is selected from the group consisting of 2-Dimethylamino-2-methyl-1-propanol, 3 hydroxy-1-methylpiperidine and 2-dimethylamino-ethanol.

The solution may contain coformulants which do not alter the performance of the basic technology. The solution may contain a surfactant which is preferably Nonylphenol ethoxylate. It may also contain as a solvent 1,4 butanediol characterized by the property of being water miscible.

The present invention provides a synergistic combination of materials which will effectively enhance the performance of fungicides. The invention provides such synergistic effects through a solution and related composition, methods and the wood products treated by the solution.

It is an object of the present invention to provide a fungal organism controlling solution, composition and method which synergistically provides a tertiary alkanolamine in combination with one or more fungicides and water or organic solvent as a solvent to provide improved resistance to fungal organisms.

It is a further object of the present invention to provide such a solution, composition and method which may be employed with a large number of fungicides to provide through synergism enhanced resistance to fungal deterioration.

It is yet another object of the present invention to provide such a system which is economical to employ.

It is a further object of the present invention to provide such superior results as verified by K-200 Greenwood Biossay and extensive testing of various combinations of fungicides with different tertiary amine alkanolamines.

It is a further object of the present invention to provide such a system which may be employed with different tertiary alkanolamines and a wide variety of fungicides to produce substantially improved results through synergism.

It is yet another object of the present invention to produce wood which has been treated by the solution, compound or method of the present invention.

It is yet another object of the present invention to provide such a system which will produce improved efficacy as confirmed by extensive testing.

It is yet another object of the present invention to provide such a system which beneficially employs inert co-formulants with the other components of the invention.

These and other objects of the invention will be readily apparent from the description which follows.

DESCRIPTION OF THE PREFERRED EMBODIMENTS

As employed herein, the term "wood-" means wood, wood-based materials, wood fiber materials, forest products, timber, lumber, engineered wood, millwork, joinery, wood laminates, laminated veneer lumber, plywood, laminated strand lumber, wood fiber composites, medium density fiberboard, particle board, hard board, oriented strand board, wood fiber resin composites, wood strand resin composites, wood particle resin composites and other wood and wood fiber-based materials and fabricated and semi-fabricated products made thereof.

As employed herein, the term "fungicide" means a material which kills or inhibits the growth of fungi, fungi spores, mold, mildew, decay, rot and sapstain.

As employed herein, the term "tertiary alkanolamines" means organic compounds that contain a hydroxyl group (—OH), also known as alcohol group and a tertiary substituted amino (—NR$_2$) group within the same molecule. As employed herein "tertiary alkanolamine" may be used interchangeably with "tertiary amino alcohols".

As employed herein, the term "DMAMP" means "2-dimethylamino-2-methyl-1-propanol.

As employed herein, the term "IBPC" means 3-iodoprop-2-yn-1-yl butylcarbamate.

Tertiary amino alcohols, or tertiary alkanolamines, are a class or organic compounds that contain a hydroxyl (—OH) group (aka alcohol group) and a tertiary substituted amino (—NR$_2$) group within the same molecule. Tertiary substituted amines contain only alkyl substituted alkyl, aryl groups were substituted aryl groups around the nitrogen atoms. This is to be contrasted with primary or secondary amine functionalities which do not contain any hydrogen or non-carbon based atoms connected to the central nitrogen atom. In addition, tertiary amino alcohols exhibit benign, inert behavior toward reactive functional groups or separate molecules when compared to primary and secondary amines. When in solution, a tertiary alkanolamine molecule with an active group would not undergo substitution or single displacement reactions and impact the original structure of the molecule. This is of consequence when it is considered that costly fungicides molecules with moderately reactive functional groups can undergo these substitutions or single displacement reactions. This provides for economic use of the present invention.

In the present invention, the fungal organism controlling solution provides a synergistic combination of a tertiary alkanolamine and at least one fungicide and a suitable solvent such as water. The tertiary alkanolamine is preferably selected from the group consisting of 2-Dimethylamino-2-methyl-1-propanol, 3 hydroxy-1-methylpiperidine and 2-dimethylamino-ethanol. In addition, certain materials which are inert to the synergistic combination of the components may be employed. A co-solvent dissolvable in water and helping to solubilize the fungicides and retain them in emulsion is 1,4 butanediol characterized by the property being water miscible. A surfactant such as nonylphenol ethoxylate may be employed.

References herein to % (m/m) will refer to weight percent based upon the entire weight of the solution.

When 2-dimethylamino-2-methyl-1-propanol is employed, it may be employed in the amount of 0.05% (m/m) to 50.00% (m/m) and preferably in the amount of 0.050% (m/m) to 10.000% (m/m) and most preferably, in the amount of 0.096% (m/m) to 0.199% (m/m). The efficacy score will be at least 34 percent and, preferably, will be at least 40 percent and most preferably, 70 percent. The solution will have a pH of about 8.00 to 12.00 and preferably about 9.00 to 11.00.

It should be understood that while the present invention has achieved certain preferred efficacy score percentages, even a very small percentage increase represents an improvement over what would otherwise exist absent the formulations of the present invention.

When the tertiary alkanolamine is 2-(Dimethylamino)-ethanol, it is preferably present in the amount of 0.050%
(m/m) to 0.415% (m/m) and has a pH of about 5.0 to 10.8 and preferably about 9.84 to 10.56. It will preferably have an efficacy score of at least 35 percent.

When the tertiary alkanolamine is 3-hydroxy-1-methylpiperidine, it will be present in the amount of about 0.092% (m/m) to 10.000% (m/m). The solution will have a pH of about 8.13 to 10.65. It will preferably have an efficacy score of at least 25.

Fungicides may be selected from the group consisting of carbamates, azoles, quaternary ammonium compounds, isophthalonitriles, thiocyanates, isothiazilinones, phenylpyroles, benzimidazoles, strobilurins, pyrazoliums, water and oil soluble organometallic copper complexes, insoluble copper salts, inorganic and organometallic borate salts and complexes.

The fungicides preferably are selected from the group consisting of 3-iodoprop-2-yn-1-yl butylcarbamate (IPBC), propiconazole, didecyl dimethylammonium bicarbonate/carbonate, propiconazole, chlorothalonil, methylene bisthiocyanate, fludioxonil, N-octyllsothiazilinone, thiabendazole, azoxystrobin, carbendazim, penflufen, copper monoethanolamine, copper carbonate, copper napthenante, copper 8-quinolinolate, and disodium octaborate tetrahydrate, fludioxonil, thiabendazole and azoxystrobin.

A preferred solution for use in the present invention will comprise a tertiary alkanolamine such as 2-dimethylamino-2-methyl-1-propanol (DMAMP) in combination with (a) the following fungicides: 3-iodoprop-2-yn-1-yl butylcarbamate (IPBC), and propiconazole, (b) a quaternary ammonium compound and (c) water. This provides a fungal organism controlling solution. The composition prior to creating the solution through mixing with water will have the same constituent ingredients.

A preferred composition would include DMAMP present in the amount of about 0.050% (m/m) to 10.000% (m/m) with IPBC being present in the amount of about 340 to 680 ppm, propiconazole in the amount of about 160 to 340 ppm and a quaternary ammonium compound such as Didecyl Dimethyl Ammonium Carbonate and Didecyl Dimethyl Ammonium Bicarbonate which is sold under the trade designation Carboquat 250T in the amount of about 240 to 980 ppm.

In addition, materials which will beneficially contribute to the effectiveness of the solution and composition may be added among these are: a surfactant such as nonylphenol ethoxylate in the amount of about 5.00% m/m to 25.00% m/m.

A co-solvent in water based formulations may be 1,4 butanediol, which is preferably employed in the amount of 0.211% m/m to 20.00% m/m. The 3-iodoprop-2-yn-1-yl butylcarbamate may preferably be provided in the range of 0.069% m/m to 10.00% (m/m).

The co-solvents and surfactants help stabilize the solution at temperature extremes.

The invention also provides wood treated by the methods employed in the solutions disclosed herein. The solution may be applied to the surface of the wood by any conventional means such as spray flood, dip, submersion, deluge, brush or mechanical assisted impregnation using elevated pressure or vacuum to facilitate impregnation into the wood.

The invention further provides a composition employing the constituents used in making the solution. The solution is created by dissolving the composition in a suitable solvent which is preferably water and/or 1,4 butanediol or an organic solvent such as, for example, Dimethylsulfoxide, N-methylpyrrolidone, acetone, isopropanol, and monoethanolamine.

Very extensive data is contained in the Table (from columns A through column HHHH).

| | A % (m/m) | B % (m/m) | C % (m/m) | D % (m/m) | E % (m/m) | F % (m/m) | |
|---|---|---|---|---|---|---|---|
| 2-Diemthylamino-2-methyl-1-propanol (CAS: 7005-47-2) | 0.100% | 0.050% | 0.100% | | 0.050% | 0.100% | (A) |
| Water | 89.400% | 93.602% | 93.552% | 93.652% | 92.257% | 92.207% | |
| Nonylphenol Ethoxylate (CAS: 127087-87-0) | 5.000% | 5.000% | 5.000% | 5.000% | 5.000% | 5.000% | |
| 1,4 butanediol (CAS: 110-63-4) | 5.500% | 1.250% | 1.250% | 1.250% | 2.600% | 2.600% | |
| 3-Iodoprop-2-yn-1-yl butylcarbamate (IPBC), (CAS: 55406-53-6) | | 0.098% | 0.098% | 0.098% | | | |
| Propiconazole (CAS: 60207-90-1) | | | | | 0.093% | 0.093% | |
| Didecyl Dimethylammonium Bicarbonate/Carbonate (CAS: Mixture) | | | | | | | |
| pH of Treating Solution | 8.50 | 10.29 | 10.85 | 7.65 | 10.02 | 10.32 | |
| % Efficacy Score (average of 10 samples) | 0% | 90% | 79% | 60% | 37% | 45% | |
| Untreated Efficacy Score (average of 10 samples) | 0% | 0% | 0% | 0% | 0% | 0% | |
| Treated Control Efficacy Score (avg of 10 samples) | 100% | 100% | 100% | 100% | 100% | 100% | |

(C)

| | G % (m/m) | H % (m/m) | I % (m/m) | J % (m/m) | K % (m/m) | L % (m/m) | M % (m/m) | N % (m/m) | |
|---|---|---|---|---|---|---|---|---|---|
| (A) | | 0.050% | 0.100% | | | 0.050% | 0.050% | 0.100% | (B) |
| | 92.307% | 89.147% | 89.097% | 89.197% | 99.352% | 99.302% | 99.302% | 99.300% | |
| | 5.000% | 5.000% | 5.000% | 5.000% | | | | | |
| | 2.600% | 5.500% | 5.500% | 5.500% | 0.211% | 0.211% | 0.211% | 0.160% | |
| | | | | | 0.069% | 0.069% | 0.069% | 0.069% | |
| | 0.093% | | | | 0.068% | 0.068% | 0.068% | 0.067% | |
| | | 0.303% | 0.303% | 0.303% | 0.300% | 0.300% | 0.300% | 0.304% | |
| | 6.82 | 9.68 | 10.04 | 8.05 | 7.06 | 7.61 | 10.53 | 10.68 | |
| | 4% | 34% | 44% | 22% | 34% | 87% | 74% | 70% | |
| | 0% | 0% | 0% | 0% | 0% | 0% | 0% | 0% | |
| | 100% | 100% | 100% | 100% | 100% | 100% | 100% | 100% | |

(D)

| | O % (m/m) | P % (m/m) | Q % (m/m) | R % (m/m) | S % (m/m) | T % (m/m) | U % (m/m) | V % (m/m) |
|---|---|---|---|---|---|---|---|---|
| (B) | 0.100% | 0.100% | 0.050% | 0.050% | 0.050% | 10.00% | 0.10% | 0.10% |
| | 99.300% | 99.300% | 99.302% | 99.302% | 99.302% | 83.45% | 93.53% | 44.90% |
| | | | | | | 5.00% | 5.00% | 25.00% |
| | 0.160% | 0.160% | 0.211% | 0.211% | 0.211% | 1.20% | 1.20% | 10.00% |
| | 0.069% | 0.069% | 0.069% | 0.069% | 0.069% | 0.10% | 0.05% | 10.00% |
| | 0.067% | 0.067% | 0.068% | 0.068% | 0.068% | 0.10% | 0.05% | 10.00% |
| | 0.304% | 0.304% | 0.300% | 0.300% | 0.300% | 0.16% | 0.08% | 10.00% |
| | 6.88 | 2.88 | 10.11 | 6.54 | 2.98 | 11.24 | 10.05 | 9.25 |
| | 73% | 94% | 68% | 75% | 89% | 55% | 45% | 100% |
| | 0% | 0% | 0% | 0% | 0% | 0% | 0% | 0% |
| | 100% | 100% | 100% | 100% | 100% | 100% | 100% | 100% |

(E)

(C)

| | W % (m/m) | X % (m/m) | Y % (m/m) | Z % (m/m) | AA % (m/m) | BB % (m/m) | |
|---|---|---|---|---|---|---|---|
| 2-Diemthylamino-2-methyl-1-propanol (CAS: 7005-47-2) | 0.100% | | 0.100% | 0.100% | 0.199% | | (A) |
| Water | 74.799% | 74.899% | 74.845% | 69.900% | 74.719% | 74.918% | |
| Nonylphenol Ethoxylate (CAS: 127087-87-0) | 5.000% | 5.000% | 5.000% | 5.000% | 5.000% | 5.000% | |
| 1,4 butanediol (CAS: 110-63-4) | 20.000% | 20.000% | 20.000% | 20.000% | 20.000% | 20.000% | |

-continued

| | | | | | | |
|---|---|---|---|---|---|---|
| Chlorothalonil (CAS: 1897-45-6) | | | | | 0.082% | 0.082% |
| Methylene BisThiocyanate (CAS: 6317-18-6) | 0.101% | 0.101% | 0.055% | 5.000% | | |
| N-OctylIsothiazilinone (CAS: 26530-21-1) | | | | | | |
| Fludioxonil (CAS: 131341-86-1) | | | | | | |
| Thiabendazole (CAS: 148-79-8) | | | | | | |
| Azoxystrobin (CAS: 131860-33-8) | | | | | | |
| carbendazim (CAS: 10605-21-7) | | | | | | |
| Penflufen (CAS: 494793-67-8) | | | | | | |
| pH of Treating Solution | 10.12 | 5.80 | 6.80 | 7.80 | 10.03 | 6.63 |
| % Efficacy Score (average of 10 samples) | 89% | 71% | 77% | 77% | 71% | 55% |
| Untreated Efficacy Score (average of 10 samples) | 0% | 0% | 0% | 0% | 0% | 0% |
| Treated Control Efficacy Score (avg of 10 samples) | 100% | 100% | 100% | 100% | 100% | 100% |

(F)

(D)

| | CC % (m/m) | DD % (m/m) | EE % (m/m) | FF % (m/m) | GG % (m/m) | HH % (m/m) | II % (m/m) | JJ % (m/m) | |
|---|---|---|---|---|---|---|---|---|---|
| (A) | 0.199% | 0.199% | 0.202% | | 0.202% | 0.202% | 0.089% | | (B) |
| | 74.760% | 69.801% | 92.164% | 92.366% | 92.181% | 86.998% | 92.218% | 92.307% | |
| | 5.000% | 5.000% | 5.000% | 5.000% | 5.000% | 5.000% | 5.000% | 5.000% | |
| | 20.000% | 20.000% | 2.600% | 2.600% | 2.600% | 2.600% | 2.600% | 2.600% | |
| | 0.041% | 5.000% | | | | | | | |
| | | | 0.002% | 0.002% | 0.001% | 2.000% | | | |
| | | | 0.016% | 0.016% | 0.008% | 1.600% | | | |
| | | | 0.016% | 0.016% | 0.008% | 1.600% | | | |
| | | | | | | | 0.093% | 0.093% | |
| | 9.98 | 9.98 | 10.75 | 7.90 | 10.75 | 10.72 | 8.02 | 10.52 | |
| | 59% | 98% | 40% | 22% | 28% | 68% | 65% | 16% | |
| | 0% | 0% | 0% | 0% | 0% | 0% | 0% | 0% | |
| | 100% | 100% | 100% | 100% | 100% | 100% | 100% | 100% | |

(G)

(E)

| | KK % (m/m) | LL % (m/m) | MM % (m/m) | NN % (m/m) | OO % (m/m) | PP % (m/m) |
|---|---|---|---|---|---|---|
| (B) | 0.089% | 0.089% | 0.093% | | 0.093% | 0.093% |
| | 92.280% | 87.311% | 85.724% | 85.817% | 85.786% | 80.817% |
| | 5.000% | 5.000% | 5.000% | 5.000% | 5.000% | 5.000% |
| | 2.600% | 2.600% | 9.090% | 9.090% | 9.090% | 9.090% |
| | 0.031% | 5.000% | | | | |
| | | | 0.093% | 0.093% | 0.031% | 5.000% |
| | 8.01 | 8.03 | 10.34 | 7.20 | 10.34 | 10.33 |
| | 32% | 72% | 31% | 5% | 21% | 55% |
| | 0% | 0% | 0% | 0% | 0% | 0% |
| | 100% | 100% | 100% | 100% | 100% | 100% |

(H)

(F)

| | QQ % (m/m) | RR % (m/m) | SS % (m/m) | TT % (m/m) | UU % (m/m) | VV % (m/m) | |
|---|---|---|---|---|---|---|---|
| 2-Diemthylamino-2-methyl-1-propanol (CAS: 7005-47-2) | 0.204% | | 0.204% | 0.204% | 0.196% | | (A) |
| Water | 74.702% | 74.906% | 74.749% | 67.796% | 79.715% | 79.911% | |
| Nonylphenol Ethoxylate (CAS: 127087-87-0) | 5.000% | 5.000% | 5.000% | 5.000% | 5.000% | 5.000% | |
| 1,4 butanediol (CAS: 110-63-4) | 20.000% | 20.000% | 20.000% | 20.000% | 20.000% | 20.000% | |

-continued

| | | | | | | |
|---|---|---|---|---|---|---|
| Copper Monoethanolamine (CAS: 14215-52-2) | | | | | 0.089% | 0.089% |
| CopperCarbonate (CAS: 12069-69-1) | | | | | | |
| Copper Napthenante (CAS: 1338-02-9) | | | | | | |
| Copper 8-Quinilinolate (CAS: 10380-28-6) | | | | | | |
| Disodium Octaborate Tetrahydrate (CAS: 12280-03-4) | 0.094% | 0.094% | 0.047% | 7.000% | | |
| pH of Treating Solution | 10.09 | 8.95 | 10.09 | 10.10 | 10.13 | 9.81 |
| % Efficacy Score (average of 10 samples) | 19% | 2% | 13% | 18% | 10% | 6% |
| Untreated Efficacy Score (average of 10 samples) | 0% | 0% | 0% | 0% | 0% | 0% |
| Treated Control Efficacy Score (avg of 10 samples) | 100% | 100% | 100% | 100% | 100% | 100% |

(I)

(G)

| | WW % (m/m) | XX % (m/m) | YY % (m/m) | ZZ % (m/m) | AAA % (m/m) | BBC % (m/m) | CCC % (m/m) | DDD % (m/m) | |
|---|---|---|---|---|---|---|---|---|---|
| (A) | 0.196% | 0.196% | 0.168% | | 0.168% | 0.168% | 0.034% | | (B) |
| | 79.755% | 69.804% | 83.065% | 83.233% | 83.119% | 76.162% | 66.554% | 66.588% | |
| | 5.000% | 5.000% | 5.000% | 5.000% | 5.000% | 5.000% | 5.000% | 5.000% | |
| | 20.000% | 20.000% | 16.670% | 16.670% | 16.670% | 16.670% | 33.330% | 33.330% | |
| | 0.049% | 10.000% | | | | | | | |
| | | | 0.097% | 0.097% | 0.043% | 7.000% | | | |
| | | | | | | | 0.082% | 0.082% | |
| | 10.12 | 10.18 | 10.31 | 8.03 | 10.30 | 10.33 | 10.55 | 7.01 | |
| | 9% | 11% | 45% | 26% | 42% | 50% | 27% | 12% | |
| | 0% | 0% | 0% | 0% | 0% | 0% | 0% | 0% | |
| | 100% | 100% | 100% | 100% | 100% | 100% | 100% | 100% | |

(J)

(H)

| | EEE % (m/m) | FFF % (m/m) | GGG % (m/m) | HHH % (m/m) | III % (m/m) | JJJ % (m/m) |
|---|---|---|---|---|---|---|
| (B) | 0.034% | 0.034% | 0.168% | | 0.168% | 0.168% |
| | 66.595% | 59.636% | 89.724% | 89.892% | 89.778% | 82.832% |
| | 5.000% | 5.000% | 5.000% | 5.000% | 5.000% | 5.000% |
| | 33.330% | 33.330% | 10.000% | 10.000% | 10.000% | 10.000% |
| | 0.041% | 7.000% | | | | |
| | | | 0.108% | 0.108% | 0.054% | 7.000% |
| | 10.52 | 10.60 | 9.98 | 2.45 | 9.90 | 9.98 |
| | 17% | 29% | 62% | 51% | 58% | 68% |
| | 0% | 0% | 0% | 0% | 0% | 0% |
| | 100% | 100% | 100% | 100% | 100% | 100% |

(K)

(I)

| | KKK % (m/m) | LLL % (m/m) | MMM % (m/m) | NNN % (m/m) | OOO % (m/m) | PPP % (m/m) | |
|---|---|---|---|---|---|---|---|
| 2-Diemthylamino-2-methyl-1-propanol (CAS: 7005-47-2) | | | | | | | (A) |
| 3-Hydroxy-1-methylpiperidine (CAS: 3554-74-3) | | 0.184% | 0.092% | 10.000% | 0.184% | | |
| 2-(Dimethylamino)-ethanol (CAS: 108-01-0) | | | | | | | |
| Water | 98.602% | 98.418% | 98.510% | 88.602% | 98.516% | 98.704% | |
| Nonylphenol Ethoxylate (CAS: 127087-87-0) | 5.000% | 5.000% | 5.000% | 5.000% | 5.000% | 5.000% | |
| 1,4 butanediol (CAS: 110-63-4) | 1.300% | 1.300% | 1.300% | 1.300% | 1.300% | 1.200% | |

-continued

| | | | | | | |
|---|---|---|---|---|---|---|
| 3-Iodoprop-2-yn-1-yl butylcarbamate (IPBC), (CAS: 55406-53-6) | 0.098% | 0.098% | 0.098% | 0.098% | | |
| Propiconazole (CAS: 60207-90-1) | | | | | | 0.096% |
| Didecyl Dimethylammonium Bicarbonate/Carbonate (CAS: Mixture) | | | | | | |
| pH of Treating Solution | 7.26 | 10.04 | 9.56 | 10.65 | 10.16 | 9.84 |
| % Efficacy Score (average of 10 samples) | 18% | 26% | 26% | 26% | 0% | 26% |
| Untreated Efficacy Score (average of 10 samples) | 0% | 0% | 0% | 0% | 0% | 0% |
| Treated Control Efficacy Score (avg of 10 samples) | 100% | 100% | 100% | 100% | 100% | 100% |

(J)

| | QQQ % (m/m) | RRR % (m/m) | SSS % (m/m) | TTT % (m/m) | UUU % (m/m) | VVV % (m/m) | WWW % (m/m) | XXX % (m/m) | |
|---|---|---|---|---|---|---|---|---|---|
| (A) | 0.184% | 0.184% | | 0.184% | 0.184% | | | | |
| | | | | | | | 0.050% | 0.184% | (B) |
| | 98.520% | 98.616% | 98.541% | 98.357% | 98.516% | 93.347% | 93.297% | 93.163% | |
| | 5.000% | 5.000% | 5.000% | 5.000% | 5.000% | 5.000% | 5.000% | 5.000% | |
| | 1.200% | 1.200% | 1.300% | 1.300% | 1.300% | 1.300% | 1.300% | 1.300% | |
| | | | | | | 0.098% | 0.098% | 0.098% | |
| | 0.096% | | | | | 0.096% | 0.096% | 0.096% | |
| | | | 0.159% | 0.159% | | 0.159% | 0.159% | 0.159% | |
| | 9.60 | 10.08 | 8.13 | 9.27 | 9.80 | 7.26 | 9.84 | 10.08 | |
| | 28% | 0% | 10% | 15% | 0% | 31% | 35% | 48% | |
| | 0% | 0% | 0% | 0% | 0% | 0% | 0% | 0% | |
| | 100% | 100% | 100% | 100% | 100% | 100% | 100% | 100% | |

(K)

| | YYY % (m/m) | ZZZ % (m/m) | AAAA % (m/m) | BBBB % (m/m) | CCCC % (m/m) | DDDD % (m/m) |
|---|---|---|---|---|---|---|
| (B) | | 5.000% | | 5.000% | 5.000% | 50.000% |
| | 0.415% | | | | | |
| | 93.032% | 88.447% | 93.447% | 88.447% | 88.447% | 43.447% |
| | 5.000% | 5.000% | 5.000% | 5.000% | 5.000% | 5.000% |
| | 1.200% | 1.200% | 1.200% | 1.200% | 1.200% | 1.200% |
| | 0.098% | 0.098% | 0.098% | 0.098% | 0.098% | 0.098% |
| | 0.096% | 0.096% | 0.096% | 0.096% | 0.096% | 0.096% |
| | 0.159% | 0.159% | 0.159% | 0.159% | 0.159% | 0.159% |
| | 10.56 | 9.23 | 7.78 | 3.35 | 6.61 | 12.56 |
| | 51% | 72% | 47% | 64% | 52% | 62% |
| | 0% | 0% | 0% | 0% | 0% | 0% |
| | 100% | 100% | 100% | 100% | 100% | 100% |

TABLE SUPPLEMENT (EEEE-HHHH)

| | EEEE % (m/m) | FFFF % (m/m) | GGGG % (m/m) | HHHH % (m/m) |
|---|---|---|---|---|
| 2-Diemthylamino-2-methyl-1-propanol (CAS:7005-47-2) | 0.100% | | 0.100% | 0.100% |
| Water | 84.850% | 84.900% | 84.800% | 81.900% |
| Nonylphenol Ethoxylate (CAS: 127087-87-0) | 5.000% | 5.000% | 5.000% | 5.000% |
| 1,4butanediol (CAS: 110-63-4) | 10.000% | 10.000% | 10.000% | 10.000% |
| N-OctylIsothiazilinone (CAS: 26530-21-1) | 0.050% | 0.100% | 0.100% | 3.00% |
| pH of Treating Solution | 9.23 | 7.12 | 9.88 | 8.99 |
| % Efficacy Score (average of 10 samples) | 96% | 81% | 98% | 99% |
| Untreated Efficacy Score (average of 10 samples) | 0% | 0% | 0% | 0% |
| Treated Control Efficacy Score (avg of 10 samples) | 100% | 100% | 100% | 100% |

The following are examples of how the solutions employed in this testing were created. These letter designations with a solution correspond directly to a heading presented in the Table. The capital letter identification of each of the following solution preparation summaries corresponds to a column of the Table which bears the identical letter.

Solution A

To a 500-mL beaker equipped with a magnetic stirrer, was added 5.000 g Nonyl Phenol Ethoxylate and 5.500 g 1,4 butanediol. The mixture was stirred while 0.100 g of 2-Dimethylamino-2-methyl-1-propanol was added. 89.400 g of water was slowly added and mixed for 5 min, forming a slightly yellow transparent solution.

Solution B

To a 500-mL beaker equipped with a magnetic stirrer, was added 5.000 g Nonyl Phenol Ethoxylate and 1.250 g 1,4 butanediol. The mixture was stirred while 0.050 g of 2-Dimethylamino-2-methyl-1-propanol was added. 0.098 g of 3-Iodoprop-2-yn-1-yl butylcarbamate (IPBC) was added and stirred until fully dissolved (7 min). 93.602 g of water was slowly added and mixed for 5 min, forming a slightly yellow transparent solution.

Solution L

To a 500-mL beaker equipped with a magnetic stirrer, was added 0.211 g 1,4 butanediol. The mixture was stirred while 0.050 g of 2-Dimethylamino-2-methyl-1-propanol was added. 0.300 gram of Didecyl Dimethylammonium Bicarbonate/Carbonate was added and the solution stirred for 2 min. 0.069 g of 3-Iodoprop-2-yn-1-yl butylcarbamate (IPBC) was added and stirred until fully dissolved (2 min). 0.068 g of Propiconazole was added and stirred until fully dissolved (2 min). 99.302 g of water was slowly added and mixed for 5 min, forming a slightly yellow transparent solution.

Solution P

To a 500-mL beaker equipped with a magnetic stirrer, was added 0.160 g 1,4 butanediol. The mixture was stirred while 0.100 g of 2-Dimethylamino-2-methyl-1-propanol was added. 0.304 gram of Didecyl Dimethylammonium Bicarbonate/Carbonate was added and the solution stirred for 2 min. 0.069 g of 3-Iodoprop-2-yn-1-yl butylcarbamate (IPBC) was added and stirred until fully dissolved (2 min). 0.067 g of Propiconazole was added and stirred until fully dissolved (2 min). 99.300 g of total water, including the 2.4 mL of 1M HCl used to adjust pH range, was slowly added, including the small addition of and mixed for 5 min, forming a slightly yellow transparent solution. pH was added dropwise with constant direct pH measurement using a calibrated pH meter.

Solution AA

To a 500-mL beaker equipped with a magnetic stirrer, was added 5.00 g Nonyl Phenol Ethoxylate and 20.00 g 1,4 butanediol. The mixture was stirred while 0.199 g of 2-Dimethylamino-2-methyl-1-propanol was added. 0.082 g of chlorothalonil was added and the solution was stirred for 5 min. 74.719 g of water was slowly added and mixed for 5 min, forming a slightly yellow transparent solution.

Solution QQ

To a 500-mL beaker equipped with a magnetic stirrer, was added 5.00 g Nonyl Phenol Ethoxylate and 20.00 g 1,4 butanediol. The mixture was stirred while 0.204 g of 2-Dimethylamino-2-methyl-1-propanol was added. 0.094 g of disodium octaborate tetrahydrate was added and the solution was stirred for 5 min. 74.702 g of water was slowly added and mixed for 5 min, forming a slightly yellow transparent solution.

Solution LLL

To a 500-mL beaker equipped with a magnetic stirrer, was added 5.00 g Nonyl Phenol Ethoxylate and 1.30 g 1,4 butanediol. The mixture was stirred while 0.184 g of 3-Hydroxy-1-methylpiperidine was added. 0.098 g of 3-Iodoprop-2-yn-1-yl butylcarbamate (IPBC) was added and the solution was stirred for 5 min. 98.418 g of water was slowly added and mixed for 5 min, forming a slightly yellow transparent solution.

Solution YYY

To a 500-mL beaker equipped with a magnetic stirrer, was added 5.00 g Nonyl Phenol Ethoxylate and 1.200 g 1,4 butanediol. The mixture was stirred while 0.415 g of 2-(Dimethylamino)-ethanol was added. 0.159 gram of Didecyl Dimethylammonium Bicarbonate/Carbonate was added and the solution stirred for 2 min. 0.098 g of 3-Iodoprop-2-yn-1-yl butylcarbamate (IPBC) was added and stirred until fully dissolved (2 min). 0.096 g of Propiconazole was added and stirred until fully dissolved (2 min). 99.032 g of water was slowly added and mixed for 5 min, forming a slightly yellow transparent solution.

In determining the percent efficacy score shown as the third from the bottom entry in the Table, the following Bioassay procedure was employed.

Readings were taken at a minimum every $7^{th}$ day to the end of the experiment (28 d). More frequent readings can be taken if the fungal organisms exhibit robust virality as witnessed on the untreated controls. Each treatment was run at 10× replication to ensure a statistically relevant sample set. Each separate assay plate containing one of the ten replicates exhibited sample position randomization to ensure there was no biasing due to proximity to another test article. Statistical % protection data was analyzed using standard outlier regression. No outliers were reported in the data sets contained in this report.

K-200 Bioassay

A K-200 Greenwood Bioassay uses Red Pine (*Pinus resinosa*) discs as the wood species to be challenged against a complex inoculum of a multi-organism Deuteromycetes fungal blend. This experiment is performed in scientifically controlled high humidity and temperature regulated incubators. Periodic readings are carefully taken by a trained mycologist in proper biologically designed hoods to eliminate any chance of airborne contamination. Spore catch plates are utilized to ensure the individual experiments are not contaminated.

The Deuteromycetes fungal challenge blend includes, *Aspergillus niger* (ATCC 6275), *Paecilomyces varioti* (16023), *Graphium rubrum* (6505), *Penicillium purpurogenum* (52427), *Diplodia gossypina* (9055), *Ceratocystis fimbriate* (14503), and *Ceratocystis clavigerum* (18086). This fungal blend is a mixture of Ascomycota and Basidiomycota rot (decay), mold, mildew, and stain organisms. Rot Fungi degrade only the cellulose and hemicellulose, and typically occur in wood of high water and nitrogen content. Molds are non-decaying wood fungi that inhabit on plant and animal matter, whereas mildew and stain organisms are more of a surface infestation and discoloration. Molds discolor the wood but they do not break down wood fibers and therefore do not weaken the wood structure. Additionally, molds, mildews, and stains can increase the capacity of the affected wood to absorb moisture creating an opening in the wood for wood decay fungi degradation.

Treatment of Wood Articles

Each red pine disc was dipped for approximately 30 seconds in varied dilutions of test solutions and allowed to dry 24 hours. The positive control was a commercial sap stain and mold control containing Positive controls treated with Treated with a solution containing 0.46% Nonylphenol ethoxylate, 0.04% Diiodomethyl-p-tolylsulfone, 0.13% Propiconazole, and 0.13% IPBC. Untreated pine discs served as the negative control. Ten replicates were used for each test dilution. Evaluations were done for up to a maximum of 28 days incubation at controlled 30° C. and 90% relative humidity.

Quantification of Efficacy

Quantification of efficacy from the treatment solution is measured as a % Overall Protection of the Disc and is based on a visual assessment of the total surface area. As shown in the table below.

| Overall Protection (%) | Deuteromycetes Growth |
| --- | --- |
| 100% | No Deuteromycetes growth on red pine disc |
| Greater than 100% | Zone of Inhibition of Deuteromycetes growth around red pine disc. |
| Less than 100% | Indicates growth of Deuteromycetes on the red pine disc. (For example, 50% means half of the disc is covered in Deuteromycetes). |

The following discussion which has paragraphs identified by capital letters equivalent to column headings in the Table provides additional guidance as to the comparative test results. The following provides a column by column detailed analysis of the specific test and the related results as shown in the Table.

A. This is a control containing the DMAMP and all inert formulants showing there is no efficacy.

B. This is a IPBC (fungicide) containing formulation with the key DMAMP at the lowest level of 0.05% to be compared to C and D.

C. This is a IPBC (fungicide) containing formulation with the key DMAMP at a higher level of 0.10% to be compared to A and D.

D. This is a IPBC (fungicide) containing formulation with the no DMAMP to be compared to A and D.

E. This is a Propiconazole (fungicide) containing formulation with the key DMAMP at the lowest level of 0.05% to be compared to F and G.

F. This is a Propiconazole (fungicide) containing formulation with the key DMAMP at a higher level of 0.10% to be compared to E and G.

G. This is a Propiconazole (fungicide) containing formulation with the no DMAMP to be compared to E and F.

H. This is a Didecyl dimethyl ammonium bicarbonate/carbonate (fungicide) containing formulation with the key DMAMP at the lowest level of 0.05% to be compared to I and J.

I. This is a Didecyl dimethyl ammonium bicarbonate/carbonate (fungicide) containing formulation with the key DMAMP at the lowest level of 0.10% to be compared to H and J.

J. This is a Didecyl dimethyl ammonium bicarbonate/carbonate (fungicide) containing formulation with zero DMAMP to be compared to H and I.

K. This is a IPBC, Propiconazole, and Didecyl dimethyl ammonium bicarbonate/carbonate containing formulation with zero DMAMP to be compared to L, M, N, O, P, Q, R, and S. This sample purposely do not contain nonyl phenol ethoxylate to demonstrate there is no positive impact on efficacy from its presence.

L. This is a IPBC, Propiconazole, and Didecyl dimethyl ammonium bicarbonate/carbonate containing formulation with DMAMP at the lowest level of 0.05% with the pH adjusted close to neutral with 0.1M HCl to be compared to K, M, N, O, P, Q, R, and S. This sample purposefully does not contain nonyl phenol ethoxylate to demonstrate there is no positive impact on efficacy from its presence.

M. This is a IPBC, Propiconazole, and Didecyl dimethyl ammonium bicarbonate/carbonate containing formulation with DMAMP at the lowest level of 0.05% with the pH left as-is to be compared to K, L, N, O, P, Q, R, and S. This sample purposefully does not contain nonyl phenol ethoxylate to demonstrate there is no positive impact on efficacy from its presence.

N. This is a IPBC, Propiconazole, and Didecyl dimethyl ammonium bicarbonate/carbonate containing formulation with DMAMP at a higher level of 0.10% with the pH left as-is to be compared to K, L, M, O, P, Q, R, and S. This sample purposefully does not contain nonyl phenol ethoxylate to demonstrate there is no positive impact on efficacy from its presence.

O. This is a IPBC, Propiconazole, and Didecyl dimethyl ammonium bicarbonate/carbonate containing formulation with DMAMP at a higher level of 0.10% with the pH adjusted close to neutral with 0.1M HCl to be compared to K, L, M, N, P, Q, R, and S. This sample purposefully does not contain nonyl phenol ethoxylate to demonstrate there is no positive impact on efficacy from its presence.

P. This is a IPBC, Propiconazole, and Didecyl dimethyl ammonium bicarbonate/carbonate containing formulation with DMAMP at a higher level of 0.10% with the pH adjusted to acidic with 0.1M HCl to be compared to K, L, M, N, O, Q, R, and S. This sample purposefully does not contain nonyl phenol ethoxylate to demonstrate there is no positive impact on efficacy from its presence.

Q. This is a IPBC, Propiconazole, and Didecyl dimethyl ammonium bicarbonate/carbonate containing formulation with DMAMP at the lowest level of 0.05% with the pH very slightly adjusted down to approximately 10 to be compared to K, L, M, N, O, P, R, and S. This sample purposefully does not contain nonyl phenol ethoxylate to demonstrate there is no positive impact on efficacy from its presence.

R. This is a IPBC, Propiconazole, and Didecyl dimethyl ammonium bicarbonate/carbonate containing formulation with DMAMP at the lowest level of 0.05% with the pH very slightly adjusted down to just acidic levels to be compared to K, L, M, N, O, P, Q, and S. This sample purposefully does not contain nonyl phenol ethoxylate to demonstrate there is no positive impact on efficacy from its presence.

S. This is a IPBC, Propiconazole, and Didecyl dimethyl ammonium bicarbonate/carbonate containing formulation with DMAMP at the lowest level of 0.05% with the pH adjusted down to just very acidic levels to be compared to K, L, M, N, O, P, Q, and R. This sample purposefully does not contain nonyl phenol ethoxylate to demonstrate there is no positive impact on efficacy from its presence.

T. This is a IPBC, Propiconazole, and Didecyl dimethyl ammonium bicarbonate/carbonate containing formulation with DMAMP at a very high level of 10.00% with no pH adjustment. This sample contains the nonyl phenol ethoxylate and can be compared to U and V.

U. This is a IPBC, Propiconazole, and Didecyl dimethyl ammonium bicarbonate/carbonate containing formulation with DMAMP at 0.10% with no pH adjustment. This sample contains the nonyl phenol ethoxylate and can be compared to T and V.

V. This is a IPBC, Propiconazole, and Didecyl dimethyl ammonium bicarbonate/carbonate containing formulation with DMAMP at 0.10% with no pH adjustment. The three fungicides were purposefully put in at 10.00% each to establish an upper bound for the active range. This sample also contains a purposeful high amount of nonyl phenol ethoxylate and can be compared to T and U.

W. This is a methylene bis thiocyanate (fungicide) containing formulation with the key DMAMP at a level of 0.10% to be compared to X, Y, and Z. These samples also have a purposeful high loading of 1,4 butanediol to show there is no impact on efficacy and to establish an upper boundary for this inert formulant.

X. This is a methylene bis thiocyanate (fungicide) containing formulation with zero DMAMP to be compared to W, Y, and Z. These samples also have a purposeful high loading of 1,4 butanediol to show there is no impact on efficacy and to establish an upper boundary for this inert formulant.

Y. This is a methylene bis thiocyanate (fungicide) at the lowest limit of 0.055%, and containing formulation with the key DMAMP at a level of 0.10% to be compared to W, X, and Z. These samples also have a purposeful high loading of 1,4 butanediol to show there is no impact on efficacy and to establish an upper boundary for this inert formulant.

Z. This is a methylene bis thiocyanate (fungicide) at the highest tested limit of 5.00%, and containing formulation with the key DMAMP at a level of 0.10% to be compared to W, X, and Y. These samples also have a purposeful high loading of 1,4 butanediol to show there is no impact on efficacy and to establish an upper boundary for this inert formulant.

AA. This is a chlorothalonil (fungicide) containing formulation with the key DMAMP at a level of 0.199% to be compared to AB, AC, and AD. These samples also have a purposeful high loading of 1,4 butanediol to show there is no impact on efficacy and to establish an upper boundary for this inert formulant.

BB. This is a chlorothalonil (fungicide) containing formulation with zero DMAMP at to be compared to AA, CC, and DD. These samples also have a purposeful high loading of 1,4 butanediol to show there is no impact on efficacy and to establish an upper boundary for this inert formulant.

CC. This is a lower limit of 0.041% chlorothalonil (fungicide) containing formulation with 0.199% DMAMP at to be compared to AA, BB, and DD. These samples also have a purposeful high loading of 1,4 butanediol to show there is no impact on efficacy and to establish an upper boundary for this inert formulant.

DD. This is an upper limit of 5.00% chlorothalonil (fungicide) containing formulation with 0.199% DMAMP at to be compared to AA, BB, and CC. These samples also have a purposeful high loading of 1,4 butanediol to show there is no impact on efficacy and to establish an upper boundary for this inert formulant.

EE. This is a fludioxonil, thiabendazole, and azoxystrobin (fungicide blend) containing formulation with the key DMAMP at a level of 0.202% to be compared to FF, GG, and HH.

FF. This is a fludioxonil, thiabendazole, and azoxystrobin (fungicide blend) containing formulation with the zero DMAMP to be compared to EE, GG, and HH.

GG. This is a fludioxonil, thiabendazole, and azoxystrobin (fungicide blend at the respective lower limits of each component) containing formulation with the key DMAMP at a level of 0.202% to be compared to EE, FF, and HH.

HH. This is a fludioxonil, thiabendazole, and azoxystrobin (fungicide blend at the respective upper limits of each component) containing formulation with the key DMAMP at a level of 0.202% to be compared to EE, FF, and GG.

II. This is a carbendazim (fungicide) containing formulation with the key DMAMP at a level of 0.089% to be compared to JJ, KK, and LL.

JJ. This is a carbendazim (fungicide) containing formulation with zero DMAMP to be compared to II, KK, and LL.

KK. This is a lower limit (0.031%) carbendazim (fungicide) containing formulation with the key DMAMP at the lower level of 0.089% to be compared to JJ, LL, and MM.

LL. This is an upper limit (5.00%) carbendazim (fungicide) containing formulation with the key DMAMP at the lower level of 0.089% to be compared to JJ, KK, and LL.

MM. This is a penflufen (fungicide) containing formulation with the key DMAMP at a level of 0.093% to be compared to NN, OO, PP, and QQ.

NN. This is a penflufen (fungicide) containing formulation with the zero DMAMP to be compared to MM, OO, PP, and QQ.

OO. This is a lower limit (0.031%) penflufen (fungicide) containing formulation with the key DMAMP at a level of 0.093% to be compared to MM, NN, PP, and QQ.

PP. This is an upper limit (5.00%) penflufen (fungicide) containing formulation with the key DMAMP at a level of 0.093% to be compared to MM, NN, OO, and PP.

QQ. This is a disodium octaborate tetrahydrate (fungicide) containing formulation with the key DMAMP at a level of 0.204% to be compared to RR, SS, and TT.

RR. This is a disodium octaborate tetrahydrate (fungicide) containing formulation with zero DMAMP to be compared to QQ, SS, and TT.

SS. This is a lower limit (0.047%) disodium octaborate tetrahydrate (fungicide) containing formulation with the key DMAMP at a level of 0.204% to be compared to QQ, SS, and TT.

TT. This is an upper limit (7.00%) disodium octaborate tetrahydrate (fungicide) containing formulation with the key DMAMP at a level of 0.204% to be compared to QQ, SS, and TT.

UU. This is a copper monoethanolamine (fungicide) containing formulation with the key DMAMP at a level of 0.196% to be compared to VV, WW, and XX.

VV. This is a copper monoethanolamine (fungicide) containing formulation with zero DMAMP to be compared to UU, WW, and XX.

WW. This is a lower limit (0.049%) copper monoethanolamine (fungicide) containing formulation with the key DMAMP at a level of 0.196% to be compared to UU, VV, and XX.

XX. This is an upper limit (10.00%) copper monoethanolamine (fungicide) containing formulation with the key DMAMP at a level of 0.196% to be compared to UU, VV, and WW.

YY. This is a particulate copper carbonate (fungicide) containing formulation with the key DMAMP at a level of 0.168% to be compared to YY, ZZ, and AAA.

ZZ. This is a particulate copper carbonate (fungicide) containing formulation with zero DMAMP to be compared to YY, AAA, and BBB.
AAA. This is a lower limit particulate copper carbonate (fungicide) containing formulation with the key DMAMP at a level of 0.168% to be compared to YY, ZZ, and BBB.
BBB. This is an upper limit particulate copper carbonate (fungicide) containing formulation with the key DMAMP at a level of 0.168% to be compared to YY, ZZ, and AAA.
CCC. This is a copper naphthenate (fungicide) containing formulation with the key DMAMP at a level of 0.034% to be compared to DDD, EEE, and FFF.
DDD. This is a copper naphthenate (fungicide) containing formulation with no DMAMP to be compared to CCC, EEE, and FFF.
EEE. This is a lower limit (0.041%) copper naphthenate (fungicide) containing formulation with the key DMAMP at a level of 0.034% to be compared to CCC, DDD, and FFF.
FFF. This is an upper limit (7.00%) copper naphthenate (fungicide) containing formulation with the key DMAMP at a level of 0.034% to be compared to CCC, DDD, and EEE.
GGG. This is a copper 8-quinolinolate (fungicide) containing formulation with the key DMAMP at a level of 0.168% to be compared to HHH, III, and JJJ.
HHH. This is a copper 8-quinolinolate (fungicide) containing formulation with zero DMAMP to be compared to GGG, III, and JJJ.
III. This is a lower limit (0.054%) copper 8-quinolinolate (fungicide) containing formulation with the key DMAMP at a level of 0.168% to be compared to HHH, JJJ, and KKK.
JJJ. This is an upper limit (7.00%) copper 8-quinolinolate (fungicide) containing formulation with the key DMAMP at a level of 0.168% to be compared to HHH, JJJ, and III.
KKK. This is a IPBC (fungicide) containing formulation with the no tertiary alkanolamine to be compared to LLL, MMM, NNN, and OOO.
LLL. This is a IPBC (fungicide) containing formulation with the tertiary alkanolamine 3-hydroxy-1-methylpiperidine at 0.184% to be compared to KKK, MMM, NNN, and OOO.
MMM. This is a IPBC (fungicide) containing formulation with the tertiary alkanolamine 3-hydroxy-1-methylpiperidine at 0.092% to be compared to KKK, LLL, NNN, and OOO.
NNN. This is a IPBC (fungicide) containing formulation with the tertiary alkanolamine 3-hydroxy-1-methylpiperidine at 10.00% to be compared to KKK, LLL, MMM, and OOO.
OOO. This is a control with no fungicides containing formulation with the tertiary alkanolamine 3-hydroxy-1-methylpiperidine at 0.184% to be compared to KKK, LLL, MMM, and OOO.
PPP. This is a propiconazole (fungicide) containing formulation with the no tertiary alkanolamine to be compared to QQQ and RRR. This is meant to show other biocides with the alternative tertiary alkanolamines.
QQQ. This is a propiconazole (fungicide) containing formulation with the tertiary alkanolamine 3-hydroxy-1-methylpiperidine at 0.184% to be compared to PPP and RRR.
RRR. This is a control with no fungicides containing formulation with the tertiary alkanolamine 3-hydroxy-1-methylpiperidine at 0.184% to be compared to PPP and QQQ.
SSS. This is a didecyl dimethylammonium carbonate/bicarbonate (fungicide) containing formulation with the no tertiary alkanolamine to be compared to TTT, and UUU. This is meant to show other biocides with the alternative tertiary alkanolamines.
TTT. This is a didecyl dimethylammonium carbonate/bicarbonate (fungicide) containing formulation with the tertiary alkanolamine 3-hydroxy-1-methylpiperidine at 0.184% to be compared to SSS and UUU. This is meant to show other biocides with the alternative tertiary alkanolamines.
UUU. This is a control with no fungicides containing formulation with the tertiary alkanolamine 3-hydroxy-1-methylpiperidine at 0.184% to be compared to SSS and TTT.
VVV. This is a IPBC, Propiconazole, and Didecyl dimethyl ammonium bicarbonate/carbonate containing formulation with no tertiary alkanolamine.
WWW. This is a IPBC, Propiconazole, and Didecyl dimethyl ammonium bicarbonate/carbonate containing formulation with the tertiary alkanolamine 2-(dimethylamino)-ethanol at 0.05% (lower limit).
XXX. This is a IPBC, Propiconazole, and Didecyl dimethyl ammonium bicarbonate/carbonate containing formulation with the tertiary alkanolamine 2-(dimethylamino)-ethanol at 0.184% (nominal limit).
YYY. This is a IPBC, Propiconazole, and Didecyl dimethyl ammonium bicarbonate/carbonate containing formulation with the tertiary alkanolamine 2-(dimethylamino)-ethanol at 0.415% (upper limit).
ZZZ. This is a IPBC, Propiconazole, and Didecyl dimethyl ammonium bicarbonate/carbonate containing formulation with the tertiary alkanolamine DMAMP at 5.00% with a pH adjustment to approximately 9.
AAAA. This is a IPBC, Propiconazole, and Didecyl dimethyl ammonium bicarbonate/carbonate containing formulation with the no tertiary alkanolamine. This serves a control with to synergist.
BBBB. This is a IPBC, Propiconazole, and Didecyl dimethyl ammonium bicarbonate/carbonate containing formulation with the tertiary alkanolamine DMAMP at 5.00% with a pH adjustment to approximately 3.
CCCC. This is a IPBC, Propiconazole, and Didecyl dimethyl ammonium bicarbonate/carbonate containing formulation with the tertiary alkanolamine DMAMP at 5.00% with a pH adjustment to just below neutral.
DDDD. This is a IPBC, Propiconazole, and Didecyl dimethyl ammonium bicarbonate/carbonate containing formulation with the tertiary alkanolamine DMAMP at 50.00% with no pH adjustment. This serves as the upper most limit on the use of the tertiary alkanolamine.
EEEE. This is a 0.05% N-octylisothiazilinone (lowest level) containing formulation with the tertiary alkanolamine DMAMP at 0.100%.
FFFF. This is a control formulation containing the N-octylisothiazilione with no DMAMP and serves as a control.
GGGG. This is a N-octylisothiazilinone containing formulation with the tertiary alkanolamine DMAMP at 0.100% where the pesticide has been adjusted to the nominal level of 0.100%.

HHHH. This is a N-octylisothiazilinone containing formulation with the tertiary alkanolamine DMAMP at 0.100% where the pesticide has been adjusted to the highest level of 3.00%.

It will be appreciated, therefore, that the present invention has provided a synergistic combination of fungicides with tertiary alkanolamines to effectively control and destroy fungal organisms. The invention may advantageously be employed by providing a solution of the same associated methods, wood treated with the same and the related composition. In addition, certain inert co-formulants may be employed in combination with the solution compositions. The preferred tertiary alkanolamine materials are selected from the group consisting of 2-Dimethylamino-2-methyl-1-propanol, 3 hydroxy-1-methylpiperidine and 2-dimethyl-amino-ethanol.

Whereas, particular embodiments of the invention have been described herein for purposes of illustration, it will be evident to those skilled in the art that numerous variations of the details may be made without departing from the invention as defined in the appended claims.

What is claimed is:

1. A method of protecting wood against fungal organisms comprising
   providing a solution having a synergistic combination of a tertiary alkanolamine selected from the group consisting of 2-(dimethylamino)-ethanol being present in the amount of about 0.05% (m/m) and 3-hydroxy-1-methylpiperidine,
   at least one fungicide selected from the group consisting of 3-iodoprop-2-yn-1-yl butylcarbamate (IPBC), propiconazole, didecyl dimethylammonium bicarbonate/carbonate, chlorothalonil, methylene bisthiocyanate, fludioxonil, N-octylisothiazolinone, thiabendazole, azoxystrobin, carbendazim, penflufen, copper monoethanolamine, copper carbonate, copper naphthenate, copper 8-quinolinolate, and disodium octaborate tetrahydrate,
   a surfactant, 1,4-butanediol and a solvent, and
   applying said solution to wood.

2. The method of claim 1 wherein
   said tertiary alkanolamine is 3-hydroxy-1-methylpiperidine.

3. The method of claim 2 wherein
   said 3-hydroxy-1-methylpiperidine is present in the amount of about 0.092% (m/m) to 10.000% (m/m).

4. The method of claim 3 wherein
   said solution has a pH of about 8.13 to 10.65.

5. The method of claim 4 wherein
   said solution has an efficacy score of at least 25 percent.

6. The method of claim 1 wherein
   said tertiary alkanolamine is 2-(dimethylamino)-ethanol being present in the amount of about 0.05% (m/m).

7. The method of claim 1 wherein
   said at least one fungicide is selected from the group consisting of 3-iodoprop-2-yn-1-yl butylcarbamate, propiconazole and
   didecyl dimethylammonium bicarbonate/carbonate.

* * * * *